United States Patent
Sasaki et al.

[11] Patent Number: 5,115,694
[45] Date of Patent: May 26, 1992

[54] LINE PRESSURE CONTROL AT CRANKING AND SUBSEQUENT WARMING-UP OPERATION OF ENGINE

[75] Inventors: Hiroshi Sasaki; Shinsuke Nakazawa, both of Yokohama; Yuji Kato, Tokyo; Tatsuo Wakahara, Kawasaki; Shigeki Shimanaka, Hadano; Hiroshi Asano, Zama; Hiroshi Yamaguchi, Yokohama; Kazuhiro Ishigami, Sagamihara; Shinichi Takenouchi, Yokosuka, all of Japan

[73] Assignee: Nissan Motor Co., Ltd., Yokohama, Japan

[21] Appl. No.: 727,246

[22] Filed: Jul. 11, 1991

[30] Foreign Application Priority Data

Jul. 11, 1990 [JP] Japan ................... 2-182906

[51] Int. Cl.⁵ ............... F16H 59/72; F16H 59/78
[52] U.S. Cl. ................................. 74/844
[58] Field of Search ............................ 74/844

[56] References Cited

U.S. PATENT DOCUMENTS

| | | | |
|---|---|---|---|
| 4,730,521 | 3/1988 | Hayasaki et al. | 74/867 |
| 4,779,489 | 10/1988 | Haley | 74/844 |
| 4,807,495 | 2/1989 | Wallace | 74/844 |
| 4,807,496 | 2/1989 | Hayasaki et al. | 74/866 |
| 4,894,780 | 1/1990 | Simonyi et al. | 74/844 |

OTHER PUBLICATIONS

Service Manual, "Nissan Full Range Electronically Controlled Automatic Transmission RE4R01A Type", Mar. 1987.

*Primary Examiner*—Dirk Wright
*Attorney, Agent, or Firm*—Foley & Lardner

[57] ABSTRACT

A hydraulic pressure, i.e., a line pressure, of a hydraulic fluid supplied from an engine driven pump toward a hydraulically actuable coupling of an automatic transmission is held at the maximum pressure value when a temperature of an automatic transmission oil is less than a predetermined temperature value. However, the hydraulic pressure is temporarily decreased from the maximum pressure value to the minimum pressure value for a period of time after cranking of the engine when the transmission oil temperature is lower than the predetermined temperature value. Owing to a decreased load on the engine by the oil pump, smooth cranking and subsequent warming-up operation of the engine is assured under cold whether condition when the automatic transmission oil temperature is lower than the predetermined temperature value.

4 Claims, 7 Drawing Sheets

FIG. 2

| | | C18 | C20 | C22 | C24 | B28 | B26 | OWC 30 | OWC 29 | GEAR RATIO | $\alpha_1 = 0.440$ $\alpha_2 = 0.493$ |
|---|---|---|---|---|---|---|---|---|---|---|---|
| D RANGE | 1ST. SPEED | | | ○ | | | | ○ | ○ | $\dfrac{1+\alpha_2}{\alpha_2}$ | 3.027 |
| | 2ND. SPEED | | ○ | ○ | | ○ | | ○ | | $\dfrac{\alpha_1+\alpha_2+\alpha_1\alpha_2}{\alpha_2(1+\alpha_1)}$ | 1.619 |
| | 3RD. SPEED | | ○ | ○ | ○ | | | ○ | | 1 | 1.000 |
| | 4TH. SPEED | | | (○) | ○ | ○ | | | | $\dfrac{1}{1+\alpha_1}$ | 0.694 |
| ENGINE BRAKE RUNNING STATE | 1ST. SPEED | | | (○) | ○ | | ○ | (○) | (○) | | |
| | 2ND. SPEED | | | (○) | ○ | ○ | | (○) | | | |
| | 3RD. SPEED | | ○ | (○) | ○ | | | (○) | | | |
| | 4TH. SPEED | | ○ | (○) | | ○ | | | | | |
| REVERSE | | ○ | | | | | ○ | | | $-\dfrac{1}{\alpha_1}$ | -2.272 |

( ) UNRELATED TO POWER TRANSMISSION

LINE PRESSURE CONTROL AT CRANKING AND SUBSEQUENT WARMING-UP OPERATION OF ENGINE

BACKGROUND OF THE INVENTION

The present invention relates to a method of and a system for controlling a hydraulic pressure, i.e., a line pressure, under which a hydraulic fluid is supplied from a pump driven by an engine toward a hydraulically actuable coupling of an automatic transmission drivingly coupled with the engine.

It is known to set the magnitude of line pressure to the maximum level when a temperature of the hydraulic fluid, i.e., a transmission oil temperature, is less than a predetermined temperature value, i.e., $-10°$ C., so as to cope with increased flow resistance owing to increased viscosity of hydraulic fluid at such low temperatures. Thus, under this condition, the magnitude of load imposed on the engine by the pump is substantially great, making smooth cranking and subsequent warming-up operation of the engine difficult.

An object of the present invention is to improve a hydraulic pressure control such that smooth cranking and subsequent warming-up operation of the engine is assured when the temperature of the hydraulic fluid is less than the predetermined temperature value.

SUMMARY OF THE INVENTION

According to one aspect of the present invention, there is provided a method of controlling a hydraulic pressure under which a hydraulic fluid is supplied from a pump driven by an engine toward a hydraulically actuable coupling of an automatic transmission drivingly coupled with the engine, the method comprising the steps of:

detecting a temperature of the hydraulic fluid and generating a temperature indicative signal indicative of said temperature detected;

comparing said temperature indicative signal with a predetermined temperature value and generating a comparison result indicative signal when said temperature indicative signal is less than said predetermined temperature value;

setting the hydraulic pressure at a first pressure value when said comparison result indicative signal is generated;

detecting a cranking operation of the engine and generating a cranking operation indicative signal indicative of occurrence of said cranking operation detected; and decreasing the hydraulic pressure to a second pressure value that is lower than said first pressure value for a period of time upon generation of said cranking operation indicative signal when said comparision result indicative signal is generated.

According to another aspect of the present invention, there is provided a system for controlling a hydraulic pressure under which a hydraulic fluid is supplied from a pump driven by an engine toward a hydraulically actuable coupling of an automatic transmission drivingly coupled with the engine, the system comprising:

means for detecting a temperature of the hydraulic fluid and generating a temperature indicative signal indicative of said temperature detected;

a control unit including:

means for comparing said temperature indicative signal with a predetermined temperature value and generating a comparison result indicative signal when said temprature indicative signal is less than said predetermined temperature value; and means for setting the hydraulic pressure at a first pressure value when said comparison result indicative signal is generated; and means for detecting a cranking operation of the engine and generating a cranking operation indicative signal indicative of occurrence of said cranking operation detected;

wherein said control unit also includes means for decreasing the hydraulic pressure to a second pressure value that is lower than said first pressure value for a period of time upon generation of said cranking operation indicative signal when said comparison result indicative signal is generated.

BRIEF DESCRIPTION OF THE DRAWINGS

FIG. 2 is a table illustrating which one or ones of frictionally engageable couplings are actuated in each of speeds;

DETAILED DESCRIPTION OF THE INVENTION

Figure 1:
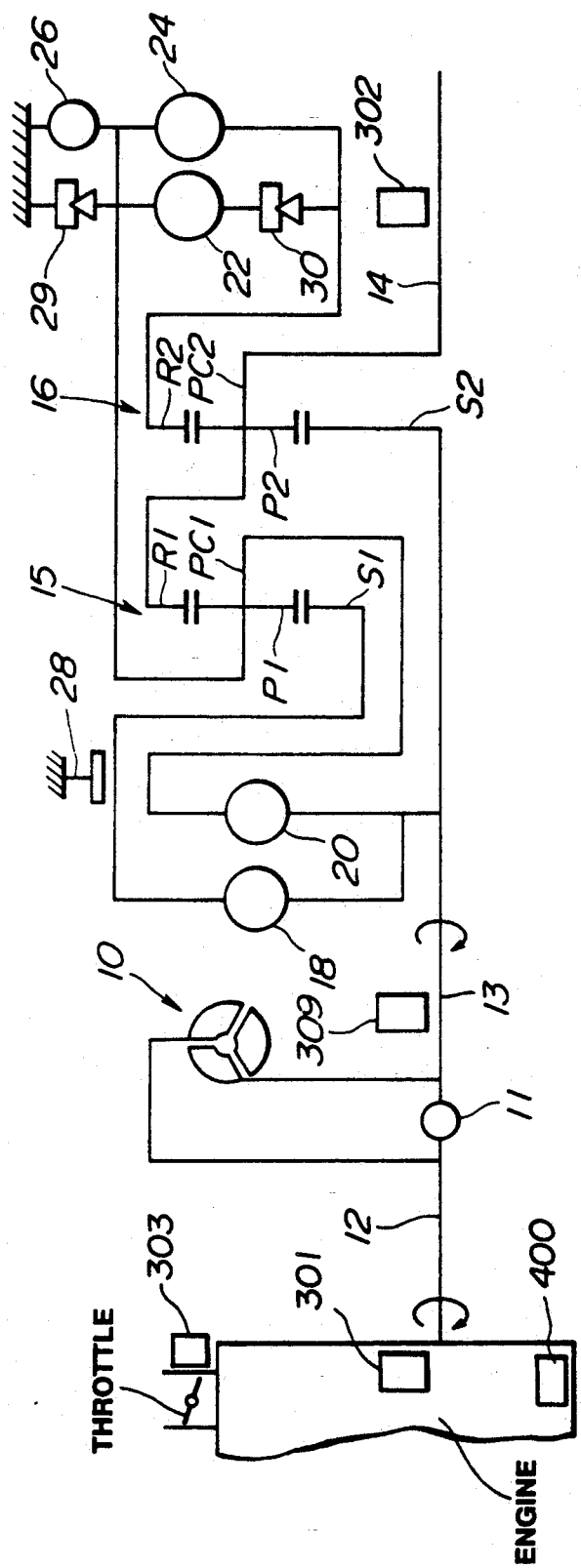
FIG. 1 is a schematic diagram of an automatic transmission coupled with an engine of an automotive vehicle.

Referring to FIG. 1, an automatic stepwise operable transmission is drivingly coupled with a torque converter 10 which is in turn drivingly coupled with an output shaft 12 of an engine of an automotive vehicle. The engine has a throttle valve which opens in degrees. The automatic transmission provides four forward speeds with an overdrive and a single reverse. The transmission includes an input shaft 13 connected to a turbine runner of the torque converter 10, and an output shaft 14 connected to a final drive gear assembly, not illustrated. It also includes a first planetary gear set 15, a second planetary gear set 16, a reverse clutch 18, a high clutch 20, a forward clutch 22, an overrunning clutch 24, a low and reverse brake 26, a band brake 28, a low one-way clutch 29, and a forward one-way clutch 30. The torque converter 10 includes therein a lock-up clutch 11. The first planetary gear set 15 comprises a sun gear S1, a ring gear R1, and a pinion carrier PC1 rotatably supporting pinion gears P1, each meshing both the sun and ring gears S1 and R1. The planetary gear set 16 comprises a sun gear S2, a ring gear R2, and a pinion carrier PC2 rotatably supporting pinion gears P2, each meshing both the sun and ring gears S2 and R2. The carrier PC1 is connectable to the input shaft 13 via the high clutch 20, while the sun gear S1 is connectable to the input shaft 13 via the reverse clutch 18. The carrier PC1 is connectable to the ring gear R2 via the forward clutch 22 and the forward one-way clutch 30 arranged in series with the forward clutch 22 or via the overrunning clutch 24 arranged in parallel to both the forward clutch 22 and forward one-way clutch 30. The sun gear S2 is connected to the input shaft 13, while the ring gear R1 and the carrier PC2 are constantly connected to the output shaft 14. The low & reverse brake 26 is arranged to hold the carrier PC1 stationary, while the band brake 28 is arranged to hold the sun gear S1 stationary. The low one-way clutch 29 is arranged to allow a rotation of the pinion carrier PC1 in a forward direction (the same direction as a direction which the engine shaft 12 rotates in), but preventing a rotation in the opposite reverse direction.

In this transmission, rotating states of various rotary elements (S1, S2, R1, R2, PC1, and PC2) of planetary gear sets 15 and 16 are varied by actuating the hydraulically actuable and frictionally engageable couplings, namely, the cluethes 18, 20, 22, 24, and brakes 26, 28, in different kinds of combination, thereby to vary a ratio, i.e., a gear ratio, of a revolution speed of the input shaft 13 to a revolution speed of the output shaft 14. Four forward speeds and a single reverse speed are provided by actuating the clutches 18, 20, 22, and 24, and the brakes 26 and 28 in various combinations as shown in FIG. 2. In FIG. 2, the sign ○ (circle) denotes that a particular coupling which it is assigned to is actuated or engaged, the signs $\alpha 1$ (alpha one) and $\alpha 2$ (alpha two) designate a ratio of number of teeth of the ring gear R1 to that of the sun gear S1 and a ratio of number of teeth of the ring gear R2 to that of the sun gear S2.

Figure 3:
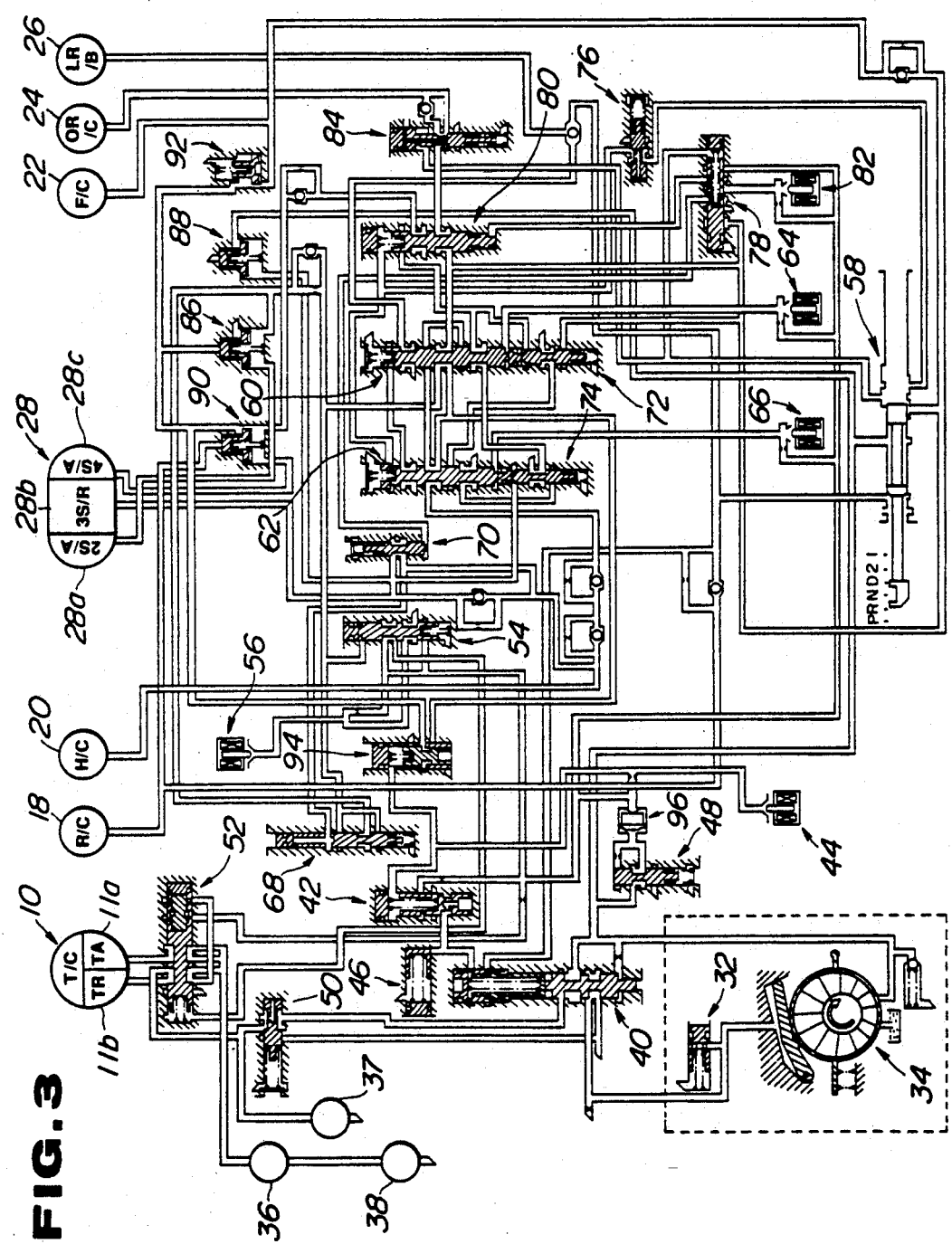
FIG. 3 is a circuit diagram of a hydraulic control system of the automatic transmission.

FIG. 3 shows a hydraulic control system of the transmission. This hydraulic control system comprises a pressure regulator valve 40, a pressure modifier valve 42, a line pressure solenoid 44, a modifier pressure accumulator 46, a pilot valve 48, a torque converter relief valve 50, a lock-up control valve 52, a first shuttle valve 54, a lock-up solenoid 56, a manual valve 58, a first shift valve 60, a second shift valve 62, a first shift solenoid 64, a second shift solenoid 66, a servo charger valve 68, a 3-2 timing valve 70, a 4-2 relay valve 72, a 4-2 sequence valve 74, a first reducing valve 76, a second shuttle valve 78, an overrunning clutch control valve 80, an overrunning clutch solenoid 82, an overrunning clutch reducing valve 84, a 1-2 accumulator 86, a 2-3 accumulator 88, a 3-4 accumulator 90, a N-D accumulator 92, an accumulator control valve 94, and a filter 96. These components are interconnected as illustrated. As illustrated, they are connected also to the before-mentioned torque converter (the torque converter 10 includes an apply chamber 11a and a release chamber 11b for the lock-up clutch 11), the forward clutch 22, the high clutch 20, the band brake 28 (the band brake 28 including a second speed apply chamber 28a, a third speed release chamber 28b, and a fourth speed apply chamber 28c), the reverse clutch 18, the low & reverse brake 26, and the overrunning clutch 24. They are connected also to the variable capacity vane type oil pump 34, the oil cooler 36, the forward lubrication circuit 37, and the rear lubrication circuit 38 as illustrated. The detailed description of these valves is hereby omitted. The automatic transmission thus far briefly described is substantially the same as an automatic transmission of RE4R-01A type which is manufactured by Nissan Motor Company Limited in Japan. The automatic transmission of the RE4R01A type is described in a service manual (publication No. A261C07) entitled "NISSAN FULL RANGE ELECTRONICALLY CONTROLLED AUTOMATIC TRANSMISSION RE4R01A TYPE" published by Nissan Motor Company Limited in March, 1987. U.S. Pat. No. 4,730,521 issued to Hayasaki et al. on Mar. 15, 1989 discloses the automatic transmission of the RE4R01A type. Thus, reference is made to the above-mentioned service manual and the U.S. Pat. No. 4,730,521 for full understanding of the automatic transmission of this type. In this automatic transmission, the magnitude of a line or system pressure is controllable by the line pressure solenoid 44. The manner of controlling the magnitude of the line pressure is described on pages I-22 to I-24 of the above-mentioned service manual. Reference is made to claims 1 to 7 of U.S. Pat. No. 4,807,496 issued to Hayasaki et al on Feb. 28, 1989 for understanding features of the line pressure control.

Figure 4:
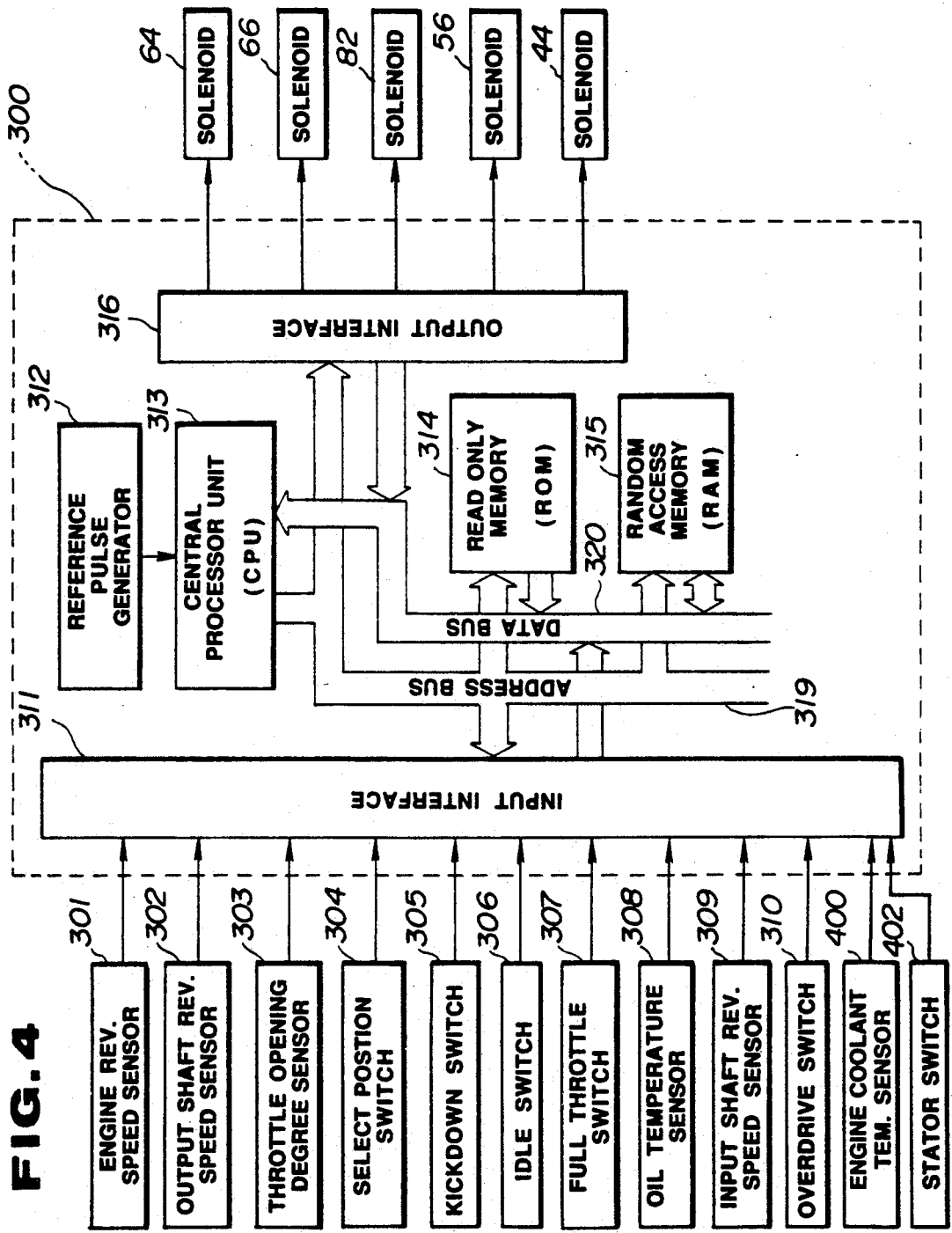
FIG. 4 is a block diagram of an automatic transmission control unit.

FIG. 4 shows an automatic transmission control unit 300 which controls the solenoids 44, 56, 64, 66 and 82. The control unit 300 comprises an input interface 311, a reference pulse generator 312, a CPU (a central processor unit) 313, a ROM (a read only memory) 314, a RAM (a random access memory) 315, and an output interface 316. They are interconnected by an address bus 319, and a data bus 320. Fed to this control unit 300 are output signals of an engine revolution speed sensor 301, an output shaft revolution speed senosor (a vehicle speed sensor) 302, a throttle opening degree sensor 303, a select position switch 304, a kickdown switch 305, an idle switch 306, a full throttle switch 307, an oil temperature sensor 308, an input shaft revolution speed sensor (a turbine revolution speed sensor) 309, an overdrive switch 310, an engine coolant temperature sensor 400, and a stator switch 402. The engine revolution speed sensor 301 detects a revolution speed of the engine $N_E$. The output shaft revolution speed sensor 302 detects a revolution speed of the output shaft 14. The throttle opening degree sensor detects an opening degree of the throttle valve TH. The select position switch detects which one of ranges is selected by the manual valve 58. The oil temperature sensor 308 detects a temperature of the automatic transmission oil $T_{ATF}$. The input shaft revolution speed sensor 309 detects a revolution speed of the input shaft 13. The engine coolant temperature sensor 400 detects a temperature of the engine coolant $T_{EC}$. The stator switch 402 is in a drive circuit for a stator motor for cranking the engine. When the stator switch 402 is turned ON or closed, the stator motor is energized to crank the engine, while when it is turned OFF, the stator motor is deenergized. Thus, a change from the ON state of the stator switch 402 to OFF state thereof is indicative of a cranking operation of the engine. The outputs of the control unit 300 are supplied to the shift solenoids 64 and 66, overrunning clutch solenoid 82, lock-up solenoid 56, and line pressure solenoid 44.

The shift valves 60 and 62 which are actuable by the corresponding shift solenoids 64 and 66, and pressure modifier valve 42 which is actuable by the line pressure solenoid 44 are controlled by the automatic transmission control unit 300.

Reference is made to pages I-22 to I-27 of the service manual (publication No. A261C07) and to the U.S. Pat. No., 4,730,521 for explanation of actuation of the solenoids 44, 64 and 66, and valves 42, 60 and 62. The necessary control functions are performed in the control unit 300.

Figure 8:
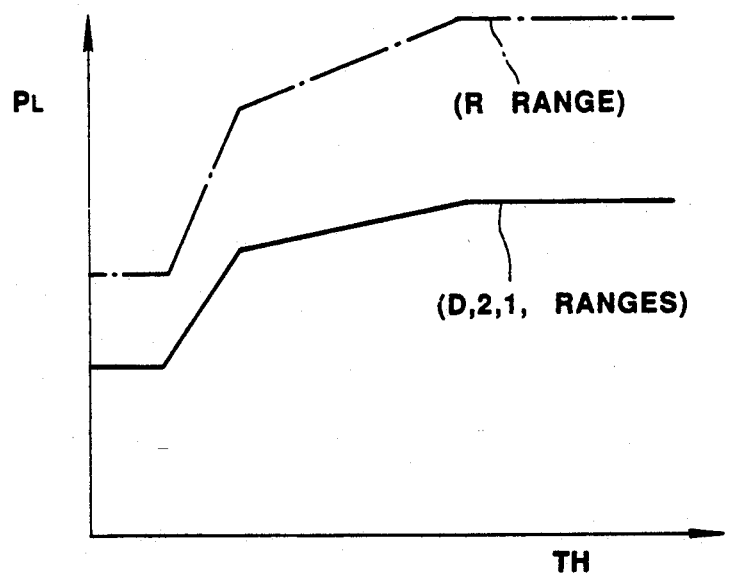
FIG. 8 is a line pressure diagram $P_L$ (TH).

The manner of the line pressure control is explained below in principle with reference to the line pressure diagram shown in FIG. 8.

Referring to FIG. 6, the fully drawn line shows a predetermined pattern of variation of a line pressure $P_L$ versus an engine load indicative signal, i.e., a throttle opening degree (TH) indicative signal, when the manual valve 58 is placed at "D" or "2" or "1" range, and one dot chain line a predetermined pattern of variation of the line pressure when the manual valve 58 is placed at "R" range. Although the line pressure is variable with variation in the throttle opening degree TH, i.e., $P_L$ (TH), at normal transmission oil temperatures $T_{ATF}$, the line pressure is held at the maximum level when the transmission oil temperature $T_{ATF}$ is lower than a predetermined value, i.e., $-10°$ C. This is because viscosity of the oil increases at such low temperatures and increased hydraulic pressure is needed to deliver the oil to appropriate portion or portions against increased flow resistance owing to increased viscosity of oil.

The principle of operation is explained below in connection with FIGS. 6A, 6B and 6C, and FIG. 5.

Figure 5:
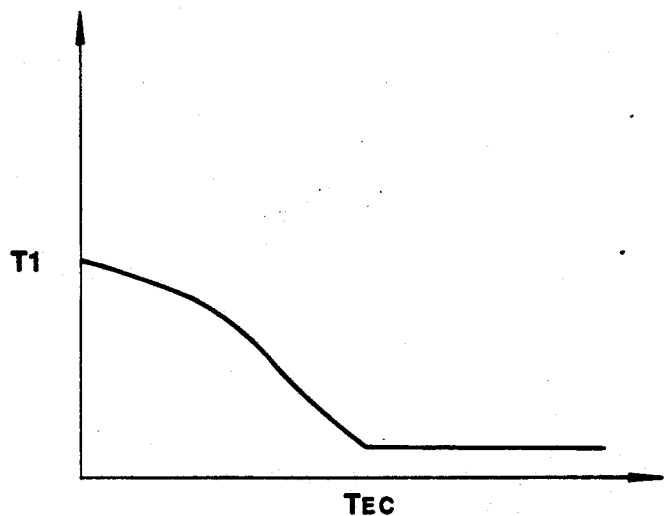
FIG. 5 a Tl vs., $T_{EC}$ diagram.
Figure 6A:
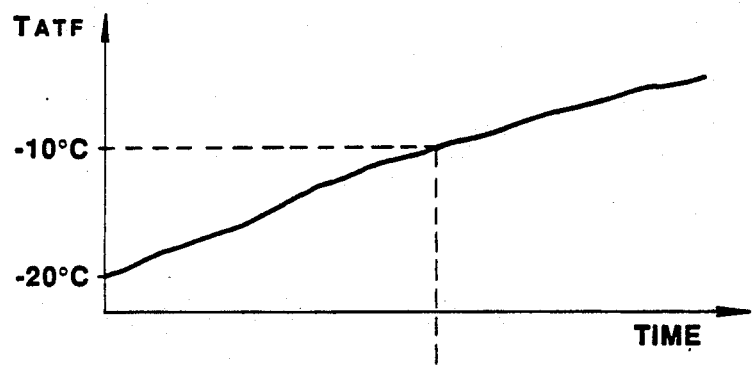
FIGS. 6A, 6B and 6C are signal and pressure diagrams for explaining the manner of operation.
Figure 6B:
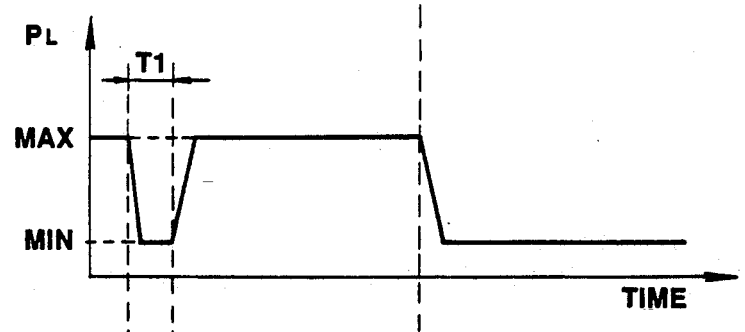
Figure 6C:
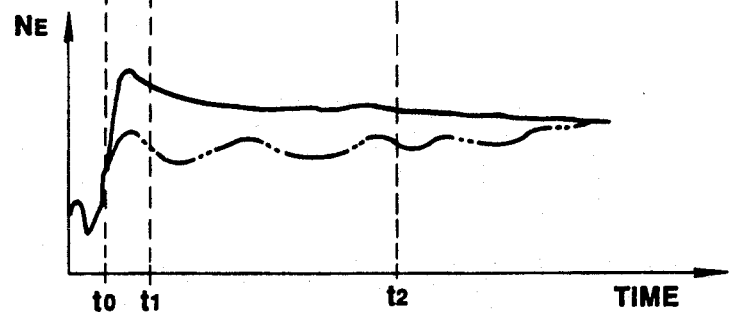

Let it be assumed that at the transmission oil temperature of $-20°$ C. (see FIG. 6A), cranking of the engine is initiated by turning the starter switch 402 to its ON position. At a moment $t_0$ (see FIG. 6B), a change from ON position of the starter switch 402 to OFF position thereof occurs. Upon or after occurrence of this change, the magnitude of line pressure is held at the minimum level for a period of time T1 and thereafter increases to the maximum level at a moment $t_1$. The magnitude of line pressure is held at the maximum level thereafter until the transmission oil temperature $T_{ATF}$ increases upto $-10°$ C. At a moment $t_2$ when the transmission oil temperature $T_{ATF}$ has reached $-10°$ C., the magnitude of line pressure decreases to the minimum level. In FIG. 6C, the fully drawn line curve shows the manner of variation of engine revolution speed $N_E$ during warming-up operation after cranking if the magnitude of line pressure is controlled as shown by the fully drawn line in FIG. 6B. Two-dot chain line shows the manner of variation of the engine revolution speed $N_E$ if the magnitude of line pressure is held at maximum at transmission oil temperature $T_{ATF}$ below $-10°$ C. Preferably, the period of time T1 becomes long as engine coolant temperature $T_{EC}$ becomes low as shown in FIG. 5.

Figure 7:
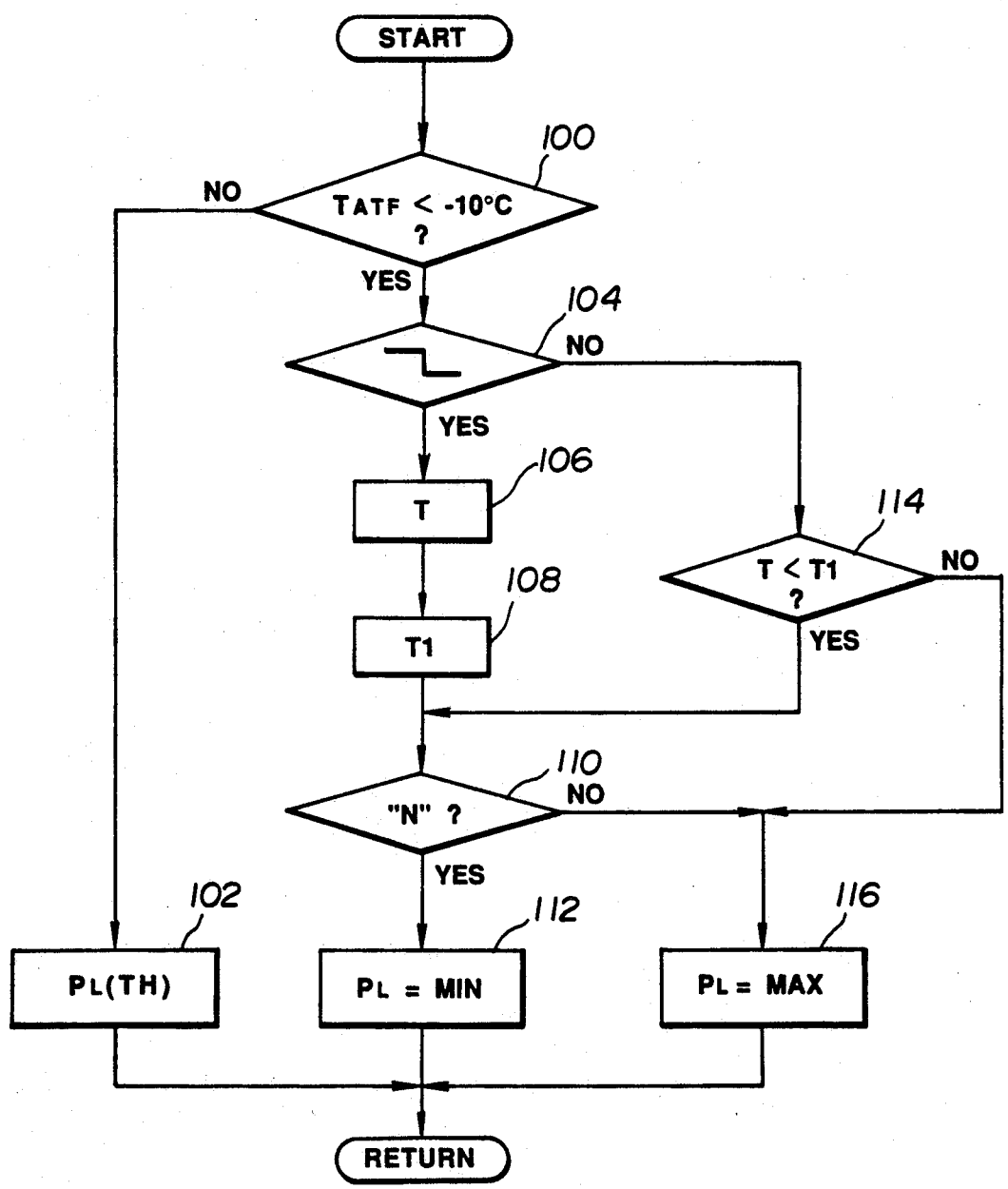
FIG. 7 is a flow diagram for explaining the sequence of necessary operating steps.

The flow diagram shown in FIG. 7 shows an example of a routine for the control explained with reference to FIGS. 6A, 6B and 6C.

In FIG. 7, there is an interrogation at 100 whether a transmission oil temperature data $T_{ATF}$ is lower than a predetermined value of $-10°$ C. If this is not the case, i.e., $T_{ATF}$ is not less than $-10°$ C., the routine proceeds to a block 102 where a table look-up operation of FIG. 8 is performed based on a throttle opening degree data TH and a range position data derived from the output of the select position switch 304 and the result is stored as $P_L$.

If the result of interrogation at 100 is affirmative, i.e., $T_{ATF}$ is less than $-10°$ C., there is another interrogation at 104 whether a change in output data of the stator switch 402 from ON state to OFF state occurs. If this is the case, the routine proceeds to a block 106 where a soft timer T is started or set in motion, and then to a block 108. At the block 108, a table look-up operation of FIG. 5 is performed based on an engine coolant temperature data $T_{EC}$ and the result is stored as T1. Following this block 108 is an interrogation at 110 whether the range position data indicates that the manual valve 58 is placed at "N" (neutral) range. If this is the case, i.e., the automatic transmission is in neutral, the routine proceeds to a block 112 where the minimum level of line pressure MIN is stored as $P_L$. In the subsequent run or cyle of this routine, the interrogation at 104 results in negative and followed by an interrogation at 114 whether the content of timer T is less than T1. Prior to expiration of period of time T1, the routine proceeds from the interrogation 114 to the above-mentioned interrogation 110. Thus, during the period of time T1 after cranking of the engine, the minimum level of line pressure MIN is set as $P_L$ at the block 112. Upon expiration of the period of time T1, the interrogation 114 results in negative and the routine proceeds to a block 116. At this block 116, the maximum level of line pressure MAX is stored as $P_L$. If the manual valve 402 should be placed to one of drive ranges from "N" range during the period of time T1, the interrogation 110 results in negative and the maximum level of line pressure MAX is set as $P_L$. The line pressure data $P_L$ determined at the block 102 or 112 or 116 is converted into an OFF duty percentage of the line pressure solenoid 44. The OFF duty percentage is outputted and the line pressure solenoid 44 is operated accordingly. As shown in FIG. 3, solenoid pressure generated by the line pressure solenoid 44 is supplied to the pressure modifier valve 42 where pressure regulation is effected based on the solenoid pressure to generate a pressure modifier pressure. The pressure modifier pressure is supplied to the pressure regulator valve 40 where pressure regulation is effected based on the pressure modifier pressure to generate the line pressure. Specifically explaining the pressure regulation to generate the line pressure, the pump 34 discharges hydraulic fluid under pressure and the amount of drainage is decreased to increase the magnitude of line pressure. Since the pump 34 is driven by the engine, the load on the engine imposed by the pump 34 increases to maximum during pressure regulation in the pressure regulator valve 40 to generate the line pressure at the maximum pressure level. The load on the engine imposed by the pump 34 decreases to the minimum during pressure regulation in the pressure regulator valve 40 to generate the linew pressure at the minimum pressure level.

From the preceding description, it is now appreciated that since the magnitude of line pressure is temporarily decreased to the minimum level, smooth cranking and warming-up operation of the engine (as seen from the fully drawn line in FIG. 6C) is assured under cold whether when the transmission oil temperature is very low.

What is claimed is:

1. A method of controlling a hydraulic pressure under which a hydraulic fluid is supplied from a pump driven by an engine toward a hydraulically actuable coupling of an automatic transmission drivingly coupled with the engine, the method comprising the steps of:

detecting a temperature of the hydraulic fluid and generating a temperature indicative signal indicative of said temperature detected;

comparing said temperature indicative signal with a predetermined temperature value and generating a comparison result indicative signal when said temprature indicative signal is less than said predetermined temperature value;

setting the hydraulic pressure at a first pressure value when said comparison result indicative signal is generated;

detecting a cranking operation of the engine and generating a cranking operation indicative signal indicative of occurrence of said cranking operation detected; and decreasing the hydraulic pressure to a second pressure value that is lower than said first pressure value for a period of time upon generation of said cranking operation indicative signal when said comparision result indicative signal is generated.

2. A method as claimed in claim 1, further comprising the steps of:

detecting a temperature of coolant of the engine and generating an engine coolant temperature indicative signal indicative of said temperature of coolant detected; and performing a table look-up operation of a predetermined data based on said engine coolant temperature indicative signal and determining said period of time for said temperature of coolant detected.

3. A method as claimed in claim 2, further comprising the step of:

increasing the hydraulic pressure to said first pressure value again upon expiration of said period of time when said comparison indicative signal is generated.

4. A system for controlling a hydraulic pressure under which a hydraulic fluid is supplied from a pump driven by an engine toward a hydraulically actuable coupling of an automatic transmission drivingly coupled with the engine, the system comprising:

means for detecting a temperature of the hydraulic fluid and generating a temperature indicative signal indicative of said temperature detected;

a control unit including:

means for comparing said temperature indicative signal with a predetermined temperature value and generating a comparison result indicative signal when said temprature indicative signal is less than said predetermined temperature value; and means for setting the hydraulic pressure at a first pressure value when said comparison result indicative signal is generated; and means for detecting a cranking operation of the engine and generating a cranking operation indicative signal indicative of occurrence of said cranking operation detected;

wherein said control unit also includes means for decreasing the hydraulic pressure to a second pressure value that is lower than said first pressure value for a period of time upon generation of said cranking operation indicative signal when said comparision result indicative signal is generated.

* * * * *